(12) United States Patent
Hilgemann et al.

(10) Patent No.: US 8,071,927 B2
(45) Date of Patent: Dec. 6, 2011

(54) METHODS AND SYSTEMS FOR WAVE GUIDES

(75) Inventors: Larinn M. Hilgemann, Sahuarita, AZ (US); Michael P. Schaub, Tucson, AZ (US); Daniel R. Melonis, Tucson, AZ (US); David G. Jenkins, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 297 days.

(21) Appl. No.: 12/476,203

(22) Filed: Jun. 1, 2009

(65) Prior Publication Data

US 2009/0294574 A1 Dec. 3, 2009

Related U.S. Application Data

(63) Continuation-in-part of application No. 11/548,968, filed on Oct. 12, 2006, now Pat. No. 7,540,449.

(60) Provisional application No. 61/157,609, filed on Mar. 5, 2009.

(51) Int. Cl.
*F41G 7/00* (2006.01)
*F42B 15/01* (2006.01)
*F42B 15/00* (2006.01)

(52) U.S. Cl. .................... 244/3.16; 244/3.1; 244/3.15

(58) Field of Classification Search ............ 244/3.1–3.3; 89/1.11; 359/237, 238, 240, 280, 284, 321, 359/324; 343/700 R, 725; 385/133, 141–143
See application file for complete search history.

(56) References Cited

U.S. PATENT DOCUMENTS

| | | | | |
|---|---|---|---|---|
| 2,513,367 A * | 7/1950 | Scott | ............... | 244/3.18 |
| 3,088,324 A * | 5/1963 | Strang et al. | ............... | 244/3.2 |
| 3,843,939 A * | 10/1974 | Groff | ............... | 359/284 |
| 3,974,984 A * | 8/1976 | Dobson et al. | ............... | 244/3.11 |
| 4,106,726 A * | 8/1978 | Emmons et al. | ............... | 244/3.17 |
| 4,131,248 A * | 12/1978 | Berglund | ............... | 244/3.16 |
| 4,183,664 A * | 1/1980 | Rambauske | ............... | 356/3.14 |
| 4,257,676 A * | 3/1981 | Greubel et al. | ............... | 385/142 |
| 4,260,219 A * | 4/1981 | Greubel et al. | ............... | 385/141 |
| 4,967,065 A * | 10/1990 | Edwards | ............... | 244/3.16 |
| 5,091,637 A * | 2/1992 | Edwards | ............... | 244/3.16 |
| 6,398,368 B2 * | 6/2002 | Chen | ............... | 385/133 |
| 6,924,772 B2 * | 8/2005 | Kiernan et al. | ............... | 343/725 |
| 7,511,253 B2 * | 3/2009 | Turner | ............... | 244/3.16 |
| 2009/0098861 A1 | 4/2009 | Kalliola et al. | | |

* cited by examiner

*Primary Examiner* — Bernarr Gregory
(74) *Attorney, Agent, or Firm* — The Noblitt Group, PLLC (57) ABSTRACT

Methods and systems for a wave guide according to various aspects of the present invention may be implemented in conjunction with a radiation collection device comprising a light pipe, a first plate and a second plate. The first plate and the second plate may be inserted into the interior of the light pipe to divide the light pipe into sections. In one embodiment, a first section plate and at least a second section plate are inserted into a light pipe. The inserted first section plate and the at least second section plate may be secured to the light pipe.

19 Claims, 8 Drawing Sheets

- 910: PROVIDING A FIRST SECTION PLATE, AT LEAST A SECOND SECTION PLATE, AND A LIGHT PIPE
- 920: COATING A SURFACE OF THE FIRST SECTION PLATE, A SURFACE OF THE AT LEAST SECOND SECTION PLATE AND A SURFACE OF AN INNER WALL OF THE LIGHT PIPE WITH A RADIATION REFLECTING MATERIAL
- 930: POLISHING THE RADIATION REFLECTING MATERIAL ON EACH SURFACE
- 940: INTERLOCKING THE FIRST SECTION PLATE TO THE LEAST SECOND SECTION PLATE
- 950: INSERTING THE INTERLOCKED PLATES INTO THE LIGHT PIPE
- 960: SECURING THE INSERTED INTERLOCKED PLATES

*FIG. 9*

METHODS AND SYSTEMS FOR WAVE GUIDES

CROSS-REFERENCES TO RELATED APPLICATIONS

This application claims the benefit of U.S. Provisional Patent Application No. 61/157,609, filed Mar. 5, 2009; and is a continuation-in-part of U.S. patent application Ser. No. 11/548,968, filed Oct. 12, 2006, now U.S. Pat. No. 7,540,449, and incorporates the disclosures of those applications by reference.

BACKGROUND OF INVENTION

Guided missiles rely upon often complex guidance systems to guide a missile to its intended target. These systems comprise numerous components that cooperate to guide the missile as accurately as possible to the intended target. Some systems comprise laser homing systems, for example a semi active laser homing (SALH) system, which rely upon a laser designated target to direct the missile. These SALH systems comprise combinations of detection devices and collection optics. The detection devices detect radiation, e.g. laser light, emanating from or reflected off of a target. To detect the radiation, collection optics collect and direct the emanated or reflected radiation to the detection devices.

The sectioned optic collectors, or light pipes, can be manufactured using a wire EDM machine, wherein surfaces of the sectioned light pipe are subsequently coated with reflective materials and polished, for example coated and polished nickel. The surfaces of the sectioned optic collectors can be polished with a Dremel® type tool, but this technique leads to a relatively rough surface finish, which in turn lowers the optical transmission of the light pipe.

SUMMARY OF THE INVENTION

Methods and systems for a wave guide according to various aspects of the present invention may be implemented in conjunction with a radiation collection device comprising a light pipe, a first plate and a second plate. The first plate and the second plate may be inserted into the interior of the light pipe to divide the light pipe into sections. In one embodiment, a first section plate and at least a second section plate are inserted into a light pipe. The inserted first section plate and the at least second section plate may be secured to the light pipe.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional elements and processing steps. Such elements and steps may be realized by any number of components and/or systems configured to perform the specified functions and achieve the various results. For example, various aspects of the present invention may be implemented in conjunction with light guiding systems, such as sectioned light pipes adapted to couple to correspondingly sectioned radiation detectors. In one embodiment, the light guiding system is associated with a radiation detection system of a missile guidance system for guiding a missile. A sectioned light pipe as part of a missile guidance system, however, is merely one exemplary implementation and application for various aspects of the invention. Various aspects of the present invention may be adapted for a multiple applications and environments, such as systems having polished or otherwise treated interior structures. Further, various aspects of the present invention may employ any number of conventional techniques for assembling, coating, polishing, and the like for light guiding systems and their components.

For example, various aspects of the present invention may be applied to methods and systems for radiation collection devices, such as for a missile guidance system. Certain representative implementations may include, for example, manufacturing methods for wave guides, such as a sectioned light pipe. In an exemplary embodiment, referring now to FIG. 1, a radiation detection system 100 may be adapted for a missile guidance system. The radiation detection system 100 includes a light guide 120 attached to a radiation detector plate 110.

Figure 1:
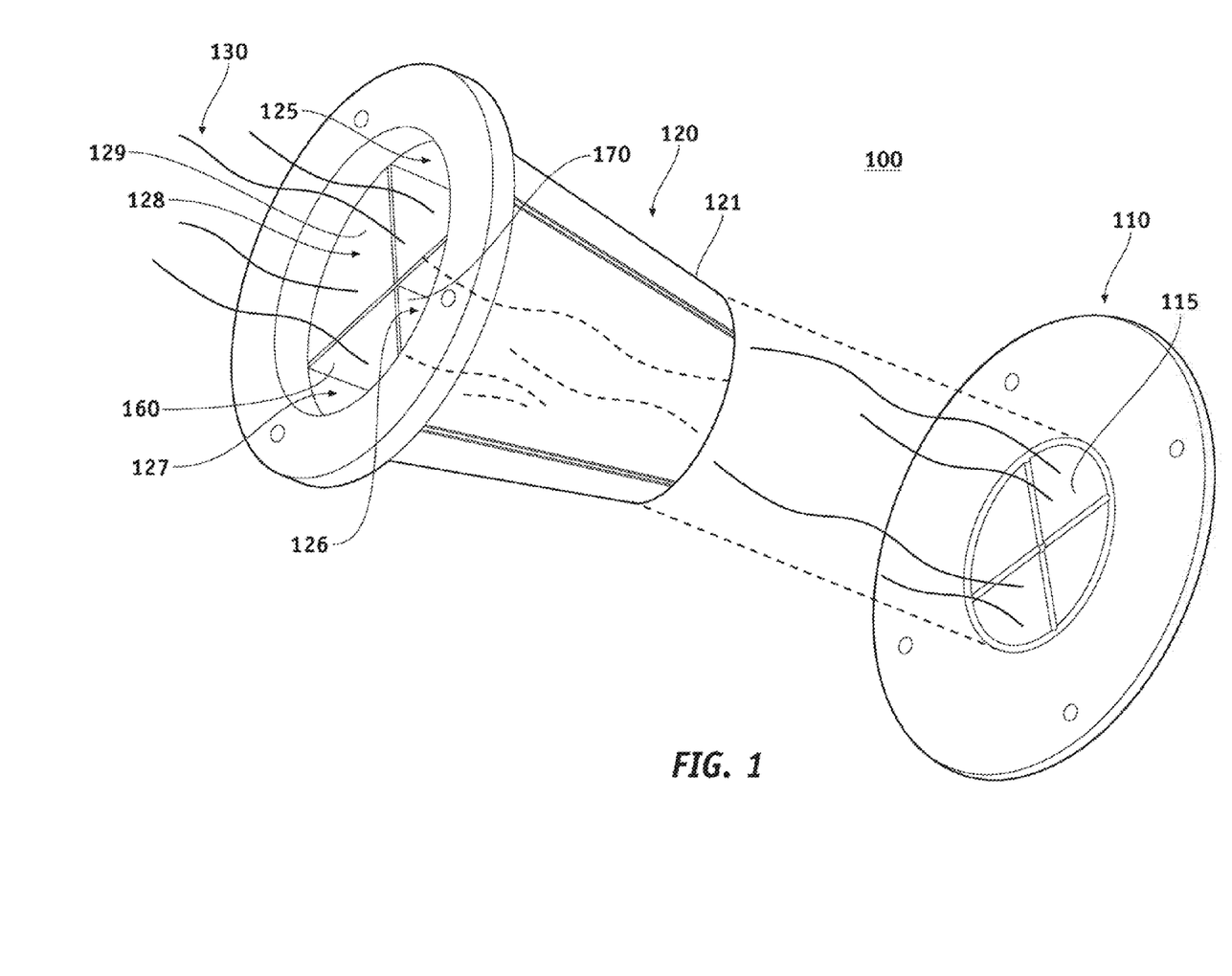
FIG. 1 is a partially exploded view of a radiation detector and a light pipe in accordance with an exemplary embodiment of the present invention.

The radiation detector plate 110 responds to incident radiation, such as by generating an electrical signal corresponding to the intensity and/or position of the incident radiation on the radiation detector plate 110. In the present embodiment, the radiation detector plate 110 comprises multiple detector sections 115. Each section 115 may generate an independent signal, for example according to the intensity of incident radiation upon the section 115. The radiation signals 130 may be further processed by other missile guidance system components (not shown) to facilitate guiding a missile. While the exemplary embodiment relates to a missile system, various aspects of the present invention may be implemented in conjunction with other systems, such as other methods and apparatus for wave guides having interior elements.

Figure 8:
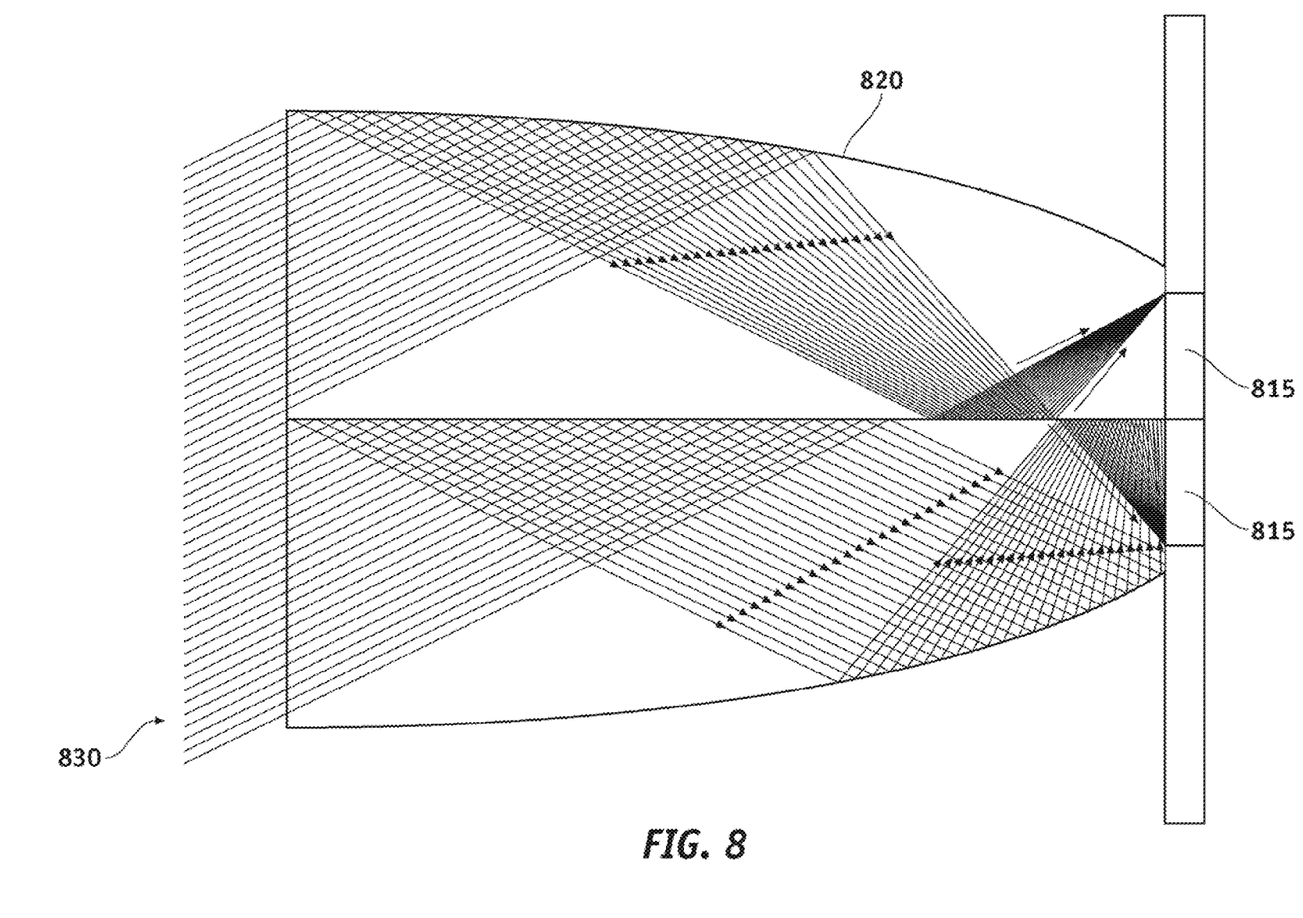
FIG. 8 representatively illustrates a longitudinal light pipe showing the manner in which incoming radiation is reflected along the light pipe and onto a radiation detector.

The light guide 120 transfers light onto the radiation detector plate 110. The light guide 120 may comprise any suitable system for transferring light, such as an optical wave guide or light pipe. In the present embodiment, the light guide 120 comprises a light pipe 121, e.g., such as an imaging or a non-imaging concentrator, adapted to guide light onto the radiation detector plate 110. In one embodiment, the light guide 120 may comprise an energy concentrator configured to transmit energy entering the entrance on through to the exit if the energy enters the entrance within a predetermined acceptance angle, and the light guide 120 may reject the energy entering the entrance if the energy enters the entrance outside the predetermined acceptance angle, for example by reflection. The energy may comprise any suitable energy, such as electromagnetic waves, for example infrared radiation, visible light, laser radiation, or the like emitted by or reflected from a target. For example, FIG. 8 illustrates a cross-section of a sectioned parabolic light guide 820 and the manner in which incoming radiation signals 830 are reflected down the length of the light guide 820 and focused onto a corresponding detector section 815.

In one embodiment, the light guide 120 (FIG. 1) comprises a non-imaging light collector, such as a compound parabolic concentrator. The light guide 120 may, however, comprise any appropriate light guide, such as an imaging concentrator, a conical concentrator, a flowline concentrator, a concentrator having a hyperbolic profile, a light pipe 121, and the like. The configuration of the light guide 120 may be selected according to any relevant criteria. For example, the light guide 120 may have an entrance aperture that is larger than the radiation detector plate 110, which may increase the apparent size of the radiation detector plate 110 and thus increase the apparent field of view (FOV) of the guidance system 100 and/or facilitate the use of a smaller radiation detector plate 110 while maintaining a desired FOV. In addition, the light guide 120 may improve the signal strength by concentrating more energy onto the radiation detector plate 110 and increasing the energy collected, especially at the edge of the FOV.

Figure 2:
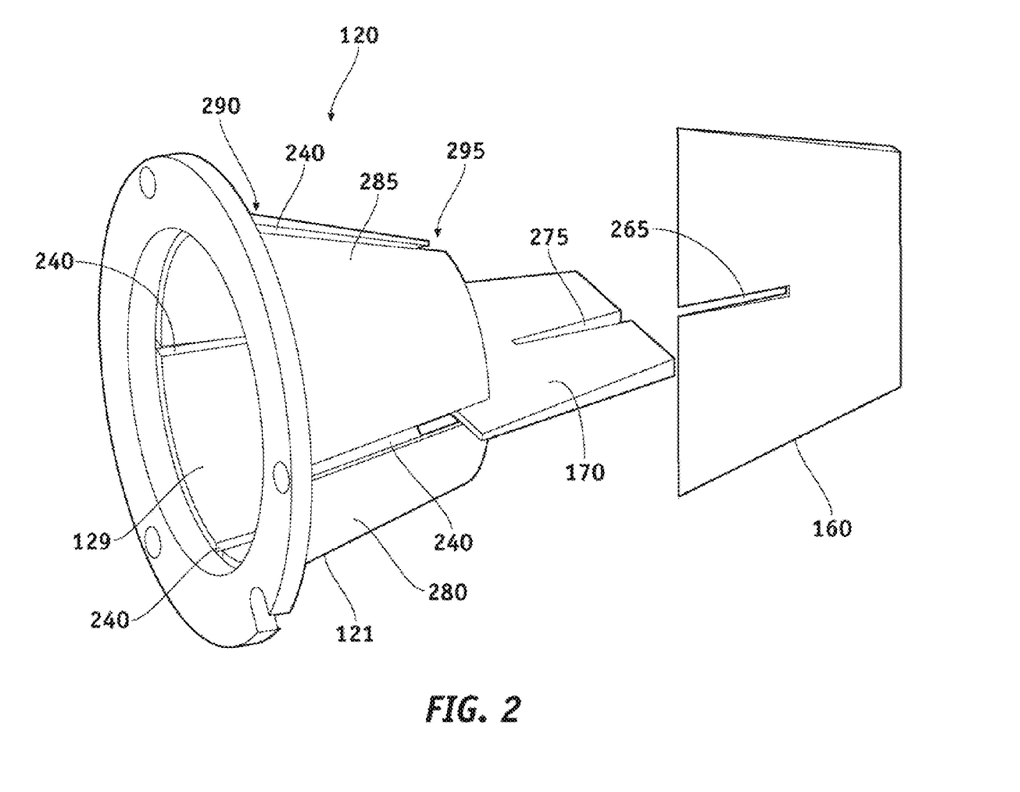
FIG. 2 representatively illustrates an exploded view of an exemplary sectioned light pipe in accordance with an embodiment of the present invention.
Figure 3:
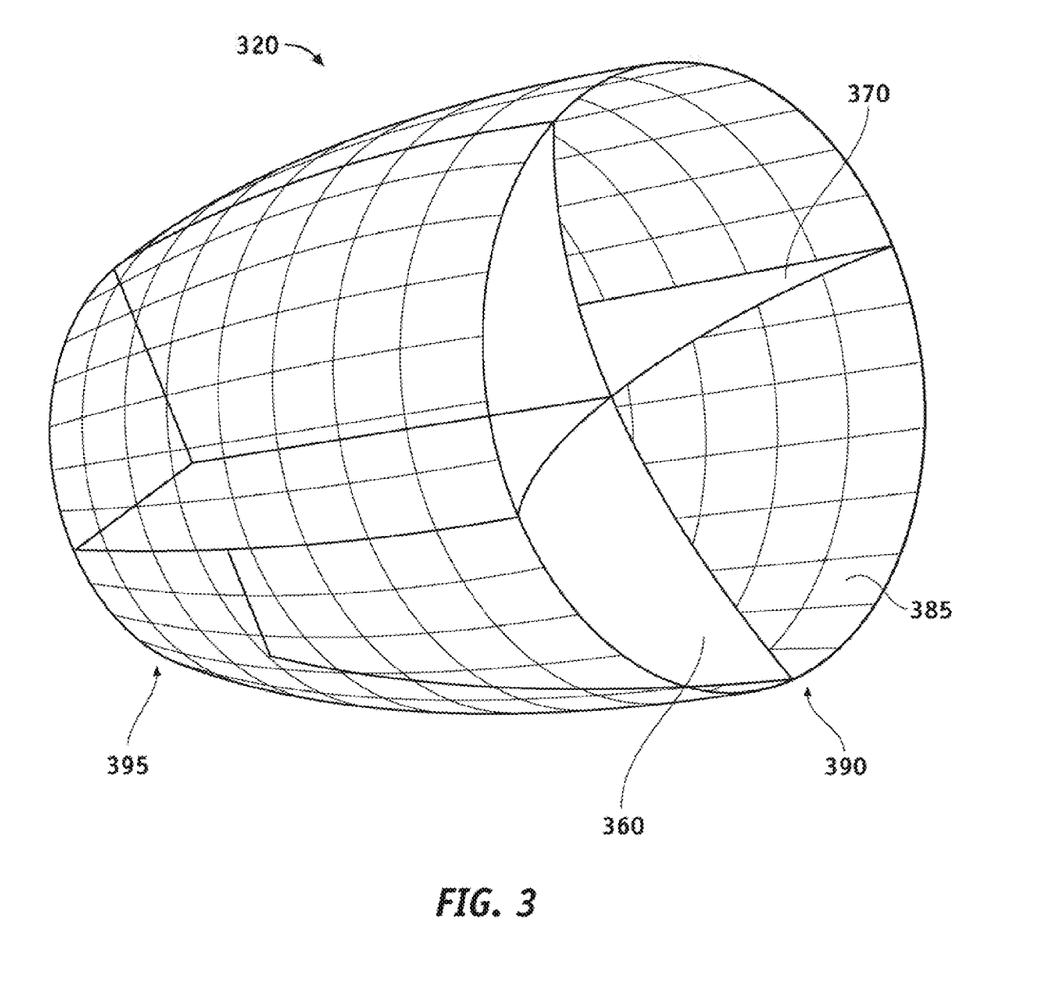
FIG. 3 representatively illustrates another exemplary embodiment of a light pipe in accordance with an embodiment of the present invention.

Referring to FIG. 2, in the present exemplary embodiment, the light guide 120 is implemented as the light pipe 121 comprising a body 285 that generally tapers from a first end 290 to a second end 295. The body 285 may taper in a linear manner from the first end 290 to the second end 295, but other embodiments may comprise other tapered configurations. For example, bodies may comprise a curve that follows a higher order function. With reference to FIG. 3, an alternative light guide body 385 may taper in a parabolic manner from the first end 390 to the second end 395. In still yet other embodiments, a light guide body 385 may not taper at all, but rather may comprise of a straight tube configuration (not shown).

The light guide body 285 (FIG. 2) may comprise any appropriate materials and may be formed in any appropriate manner. For example, the light guide body 285 may comprise metal, plastic, ceramic, composite materials, wood, or any other appropriate material. The light guide body 285 may be lathed, extruded, welded, molded, and/or otherwise formed.

In the present embodiment, the light pipe 121 comprises an inner wall 129 defining a hollow interior through which the radiation signals are transmitted. The inner wall 129 may be reflective to facilitate the reflection of the radiation signals 130 within and/or through the light pipe 121. The reflectivity of the inner wall 129 may be implemented in any suitable manner. For example, the inner wall 129 may comprise a reflective material, which may also be polished to enhance its reflectivity. For example, the light guide 120 may comprise aluminum, stainless steel, and/or the like.

Alternatively, the inner wall 129 may be coated with or otherwise support a reflective material. In one embodiment, the inner wall 129 may be coated with a reflective material and then polished to a fine finish suitable to reflect incoming radiation signals along the light pipe. In accordance with various exemplary embodiments, the various components may be coated with any material that may be polished to reflect a radiation signal, for example metals such as gold, silver, chrome, aluminum, nickel, stainless steel, and any appropriate combinations thereof. Also, any other suitable natural and/or synthetic reflective material may be used. The reflective material may be applied by any appropriate method, for example spraying, electro-plating, vapor depositing, pouring, painting, and the like. Moreover, any suitable polishing techniques may be used to provide and/or enhance the reflective surface. For example, drills, polishers, slurries, buffers, and the like may be used.

The light guide 120 may be further configured to direct energy entering the light guide 120 to selected areas. For example, depending upon the point of entry of the radiation into the light guide 120 a particular section of the light guide 120 may direct the radiation onto a particular detection section, such as a detection section 115. Referring again to FIG. 1, the light pipe 121 interior may be divided into sections, such as four sections 125-128. Each section 125-128 may guide incoming radiation to a particular section of the radiation detector plate 110, for example the detector sections 115. The light guide 120 of the present embodiment may include two or more longitudinal sections that are configured such that energy entering the light pipe 121 in a particular section is confined to the same section 125-128.

The sections 125-128 are defined by section plates 160, 170 within the light pipe 121. The section plates 160, 170 may be configured in any appropriate manner to guide radiation signals to the proper section of the radiation detector plate 110. For example, the section plates 160, 170 may include reflective surfaces to reflect the incoming radiation signals. The reflective surfaces reflect the relevant energy within the respective sections 125-128. By reflecting the energy within the section 125-128, the section plates 160 and/or 170 may inhibit crosstalk and interference caused by energy entering different sections of the light guide 120.

The reflectivity of the section plates 160, 170 may be implemented in any suitable manner. The section plates 160, 170 may comprise one or more reflective materials, which may be polished to enhance reflectivity. For example, the section plates 160, 170 may comprise aluminum, stainless steel, and/or the like. Alternatively, the section plates 160, 170 may be coated with or otherwise support a reflective material. In one embodiment, the section plates 160, 170 may be coated with a reflective material and then polished to reflect incoming radiation signals. In accordance with various exemplary embodiments, the section plates 160, 170 may be coated with any material that may be polished to reflect a radiation signal, for example metals such as gold, silver, chrome, aluminum, nickel, stainless steel, and any suitable combinations thereof. Also, any other suitable natural and/or synthetic reflective material may be used. The reflective material may be applied by any appropriate method, for example spraying, electro-plating, vapor deposition, pouring, painting, and the like. Moreover, any suitable polishing techniques may be used to provide and/or enhance the reflective surface. For example, drills, polishers, slurries, buffers, and the like may be used.

The light guide 120 may comprise multiple elements. For example, the light pipe 121 and the section plates 160, 170 of the present embodiment may be separate components that are joined to form the light guide 120. In addition, the section plates 160, 170 may comprise separate components that are assembled to form the sections 125-128 within the light pipe 121. Utilizing separate elements facilitates manufacturing the elements and treatment of their respective surfaces for reflectivity. In one embodiment, the separate components may be assembled after being coated and/or polished, which facilitates a smoother, finer finish on the reflective surfaces. In the present exemplary embodiment, the surfaces of the section plates 160, 170, as well as the inner wall 129 of the light pipe 121 can be more easily coated and polished prior to assembly.

In accordance with various exemplary embodiments, the section plates may be individually coated and polished, and then assembled together. For example, instead of using a wire EDM to machine out each section of a substantially solid tube to form a sectioned light pipe, by manufacturing each of the components separately, the separate manufacturing allows for a greater variety of manufacturing options for each component. For example, the individual section plates may be milled, fly cut, punched, molded, formed, extruded, pressed, rolled, cast, or otherwise formed according to suitable techniques.

Moreover, each of the section plates may be coated with a reflective material and/or polished to reflect incoming radiation signals. In accordance with various exemplary embodiments, the various components may be formed of, coated with, or support a surface comprising any suitable reflective material, such as a material that may be polished to reflect a radiation signal, for example metals such as gold, silver, chrome, aluminum, nickel, stainless steel, and any suitable combinations thereof. Also, any other suitable reflective natural and/or synthetic material may be used. The coatings may be applied by any known material coating method, for example, the coatings may be sprayed, electro-plated, vapor deposited, poured, painted, and the like.

Some embodiments may not comprise coatings, but rather may comprise the material itself. For example, instead of coating section plates with aluminum and polishing the aluminum coating, the section plates may comprise aluminum, which may then be polished. Moreover, any polishing methods may be used to provide and/or enhance a reflective surface. For example drills, polishers, slurries, buffers, and the like items may be used.

The light guide 120 may be assembled in any appropriate manner and/or suitable configuration. For example, the section plates 160, 170 may be assembled and inserted into the light pipe 121, such as after coating and/or polishing. In accordance with an exemplary embodiment of the present invention, referring to FIG. 2, the light guide 120 may comprise at least two section plates, for example section plates 160, 170, to divide the light guide 120 into four sections 125-128. The first section plate 160 and the second section plate 170 may interlock via slots 265, 275. The interlocked section plates 160, 170 may be inserted into the light guide 120 to divide the light pipe 121 interior into the various sections, such as sections 125-128. In the present embodiment, the section plates 160, 170 when inserted into the light pipe 121, divide the light pipe 121 interior into substantially equally dimensioned sections.

Figure 4:
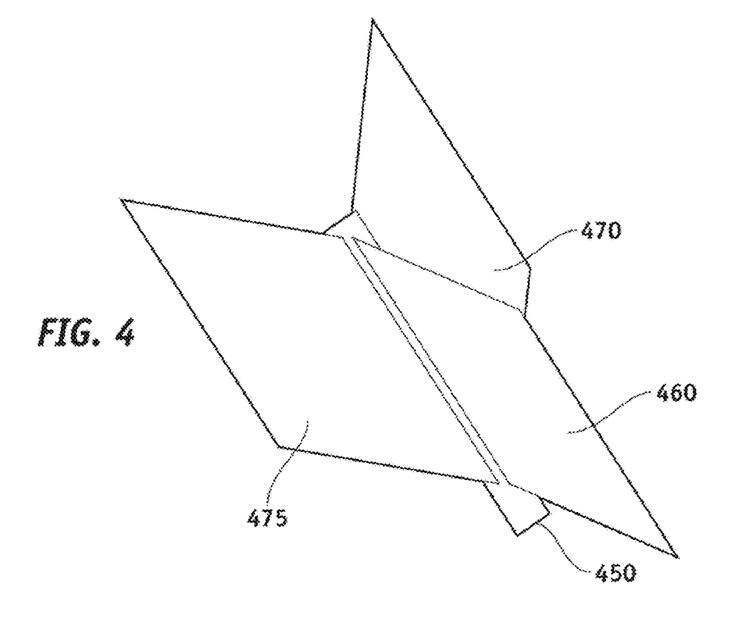
FIG. 4 representatively illustrates an exemplary plate-spine configuration in accordance with an exemplary embodiment of the present invention.

In accordance with other exemplary embodiments, the section plates may be alternatively configured for assembly and insertion into the light pipe 121 to form various sections. For example, referring to FIG. 4, the light pipe 121 may be sectioned by a spine/plate assembly. Two or more section plates, for example section plates 460, 470, 475, may be coupled to a center spine 450 (FIG. 4). The assembly may then be inserted into the light pipe 121. The section plates 460, 470, 475 may be affixed to the center spine 450 by any appropriate mechanism or technique, such as by epoxies or other adhesives, friction fits, welds, screws, and/or bolts.

Figure 6A:
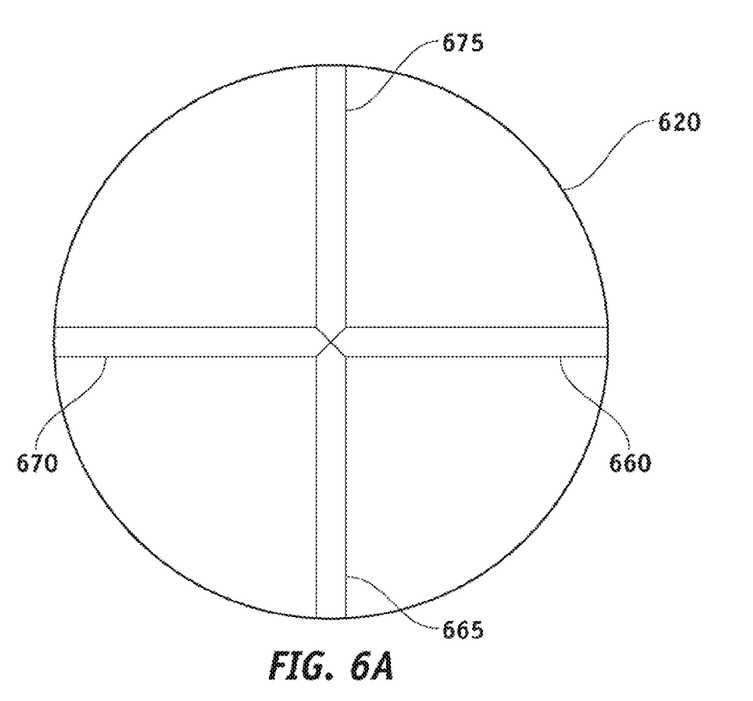
FIGS. 6A-6B representatively illustrate various sectioned light pipe cross-sections in accordance with exemplary embodiments of the present invention.
Figure 6B:
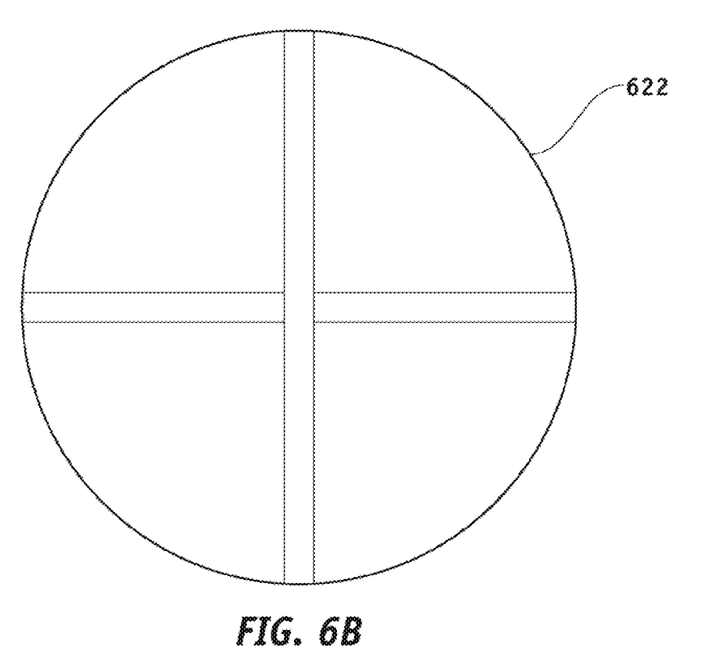

In another embodiment, referring to FIGS. 6A-B, the section plates may not interlock or rely upon a center spine. Instead, the section plates may be beveled at an intersection and the beveled plates may abut one another so as to provide an appropriate assembly fit. For example, in FIG. 6A, the central edges of four abutting plates 660, 665, 670, 675 may be configured to engage each other. In another embodiment, referring to FIG. 6B, the plates within a light pipe 622 may not be beveled at an intersection, but may merely abut one another.

Figure 5A:
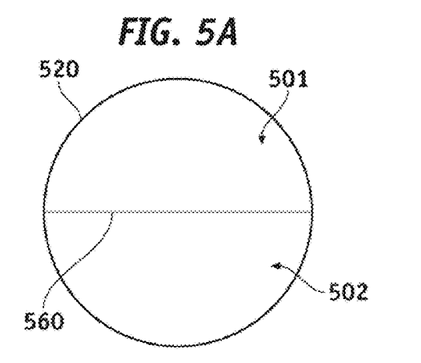
FIGS. 5A-5D representatively illustrate various sectioned light pipe cross-sections in accordance with exemplary embodiments of the present invention.
Figure 5B:
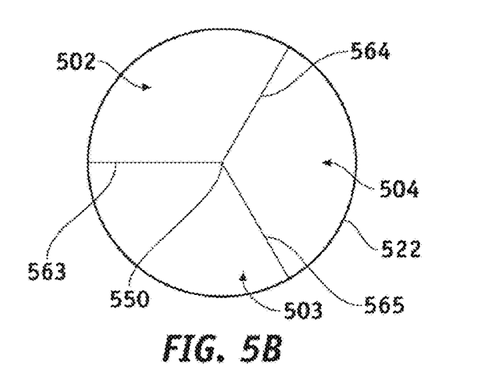

The sections within the light guide 120 may be selected and configured according to any suitable criteria. In accordance with various exemplary embodiments and with reference now to FIGS. 5A-5D, various sectioned light pipe configurations are shown as cross-sections. In one embodiment, a single section plate 560, as shown in FIG. 5A, may be inserted into a light pipe 520 to form a light pipe that comprises two sections, for example sections 501 and 502. In another embodiment, a tri-sectioned light pipe configuration may be formed, for example by a spine and plate assembly similar to the one described and shown in FIG. 4. In this embodiment (FIG. 5B), a light guide 522 may comprise a center spine 550 further comprising three section plates 563-565 that are suitably coupled to the spine 550. The assembly may then be inserted into the light pipe 522 to form three sections, for example sections 503-505 of the tri-sectioned light pipe 522.

Figure 5C:
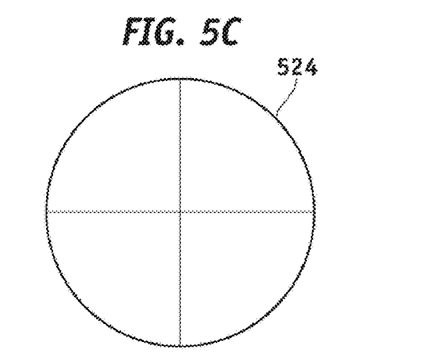
Figure 5D:
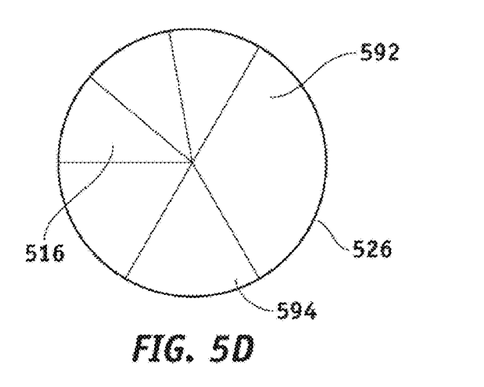

In yet another embodiment, and with reference to FIG. 5C, a quad-sectioned light pipe 524 may be formed. The quad-sectioned light pipe may be formed by two interlocking plates, for example as described and shown in FIGS. 1-3, or the quad-sectioned light pipe may be similarly formed by the spine and plate configuration, for example as described and shown in FIGS. 4 and 5B. In still yet another exemplary embodiment and with reference to FIG. 5D, a light pipe 526 comprising n number of sections may be formed by interlocking plates, a spine and plate assembly, or other appropriate mechanism. In general, n number of light pipe sections may be formed by n/2 number of interlocked plates. For example, four sections may be formed by two interlocked plates, six sections may be formed by three interlocked plates, etc. However, n number of light pipe sections may also be formed by n number of plates assembled together with a center spine.

In accordance with various exemplary embodiments, a light pipe may comprise substantially equal dimension sections, as shown in FIGS. 1, 3, 5A, 5B, 5C, 6A, and 6B, but in some embodiments, the light pipe may comprise sections that are not substantially equal. For example, and with reference to FIG. 5D, an irregularly sectioned light pipe is shown. In this embodiment, section 592 may comprise a larger volume than section 594, which in turn may be larger than section 596, and so forth.

Figure 7A:
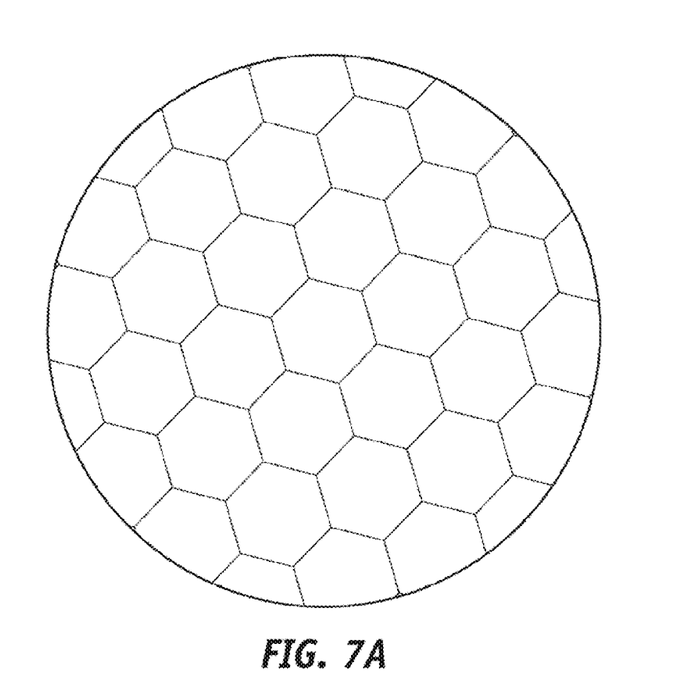
FIGS. 7A-7B representatively illustrate various sectioned light pipe cross-sections in accordance with exemplary embodiments of the present invention.
Figure 7B:
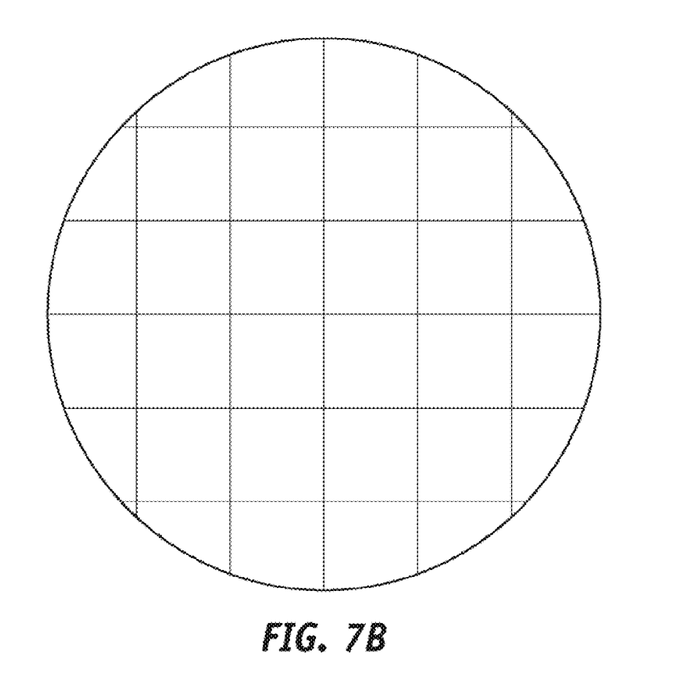

Among the various exemplary embodiments shown and described, a sectioned light pipe comprises cross-sectional embodiments akin to a sectioned "pie", e.g., FIGS. 5 and 6 show exemplary cross-section "pie" embodiments. In accordance with other exemplary embodiments and with reference to FIGS. 7A-B, a light pipe may comprise various other embodiments that may benefit from being sectioned in other manners. For example and with reference to FIGS. 7A and 7B, section plates may be coated, polished, assembled, and inserted into a light pipe to form a honey comb type cross-section embodiment (FIG. 7A), or other section plates may be coated, polished, assembled, and inserted into a light pipe to form a grid type cross-section embodiment (FIG. 7B). Other embodiments comprising other plate configurations now known or developed in the future may also be used.

The section plates may be secured within the light pipe 121 in any appropriate manner, for example via friction fit, fasteners, grooves, retainers, and/or adhesives. Referring to FIG. 2, in an exemplary embodiment, the light pipe 121 may comprise sidewall notches 240 to receive at least a portion of interlocked section plates 160, 170. The interlocked section plates 160, 170 may be secured to the sidewall notches 240 by any suitable mechanism. For example, the interlocked section plates 160, 170 may be secured by epoxies, or other glues, friction fits, welds, screws, bolts, and/or any other suitable securing mechanism.

Alternatively, referring to FIG. 3, the interlocked section plates 360, 370 may not be fitted into notches, but instead may be placed completely within a contiguous light pipe 320. In still yet another exemplary embodiment, the interlocked section plates may fit into grooves formed in the inner surface 129 of the light pipe 121, instead of fitting into notches that pass completely through a sidewall as shown in FIGS. 1 and 2, or within a contiguous sidewall as shown in FIG. 3. These exemplary mechanisms for affixing the interlocked section plates to the light pipe are merely exemplary, and any other suitable mechanisms may be used to maintain the section plates in position relative to the light pipe 121.

The light guide 120 may be fabricated, assembled, and/or incorporated into another system, such as a missile guidance system, in any appropriate manner. In one embodiment, each section plate and the light pipe are individually formed. The individual parts may be treated to enhance reflectivity, such as the reflectivity of one or more surfaces. The parts may then be assembled to form the light guide 120.

Figure 9:
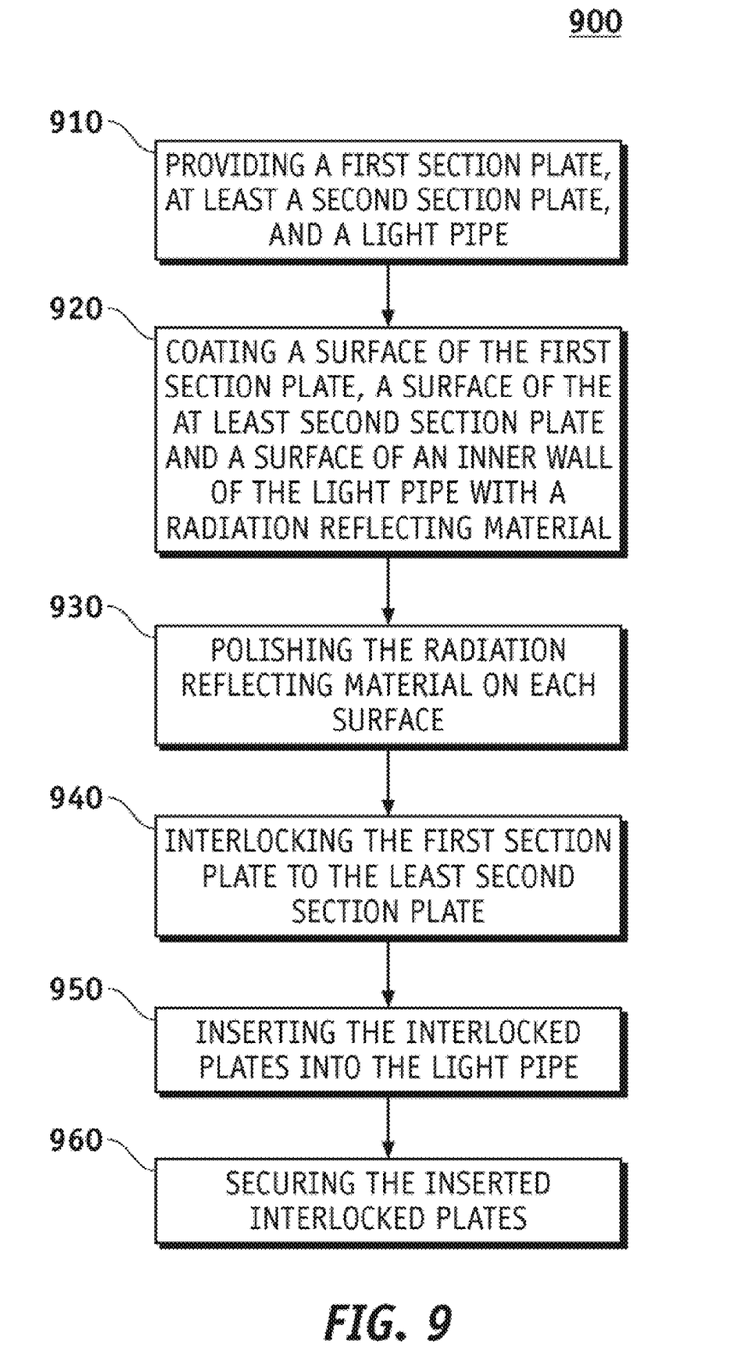
FIG. 9 representatively illustrates a flow chart outlining an exemplary method of manufacturing a sectioned light pipe, in accordance with exemplary embodiments of the present invention.

For example, referring to FIG. 9, an exemplary method 900 for forming a light guide 120 according to various aspects of the present invention comprises providing a first section plate, at least a second section plate, and a light pipe (910). As noted above, the various elements may be provided in any suitable manner, such as in conjunction with appropriate manufacturing techniques, including stamping, molding, extrusion, and the like. If desired, other features may be added to the various elements, such as grooves or notches in the light pipe 121 to connect to the section plates.

The elements may then be treated to form or enhance reflective surfaces. For example, the sides of the section plates 160, 170 may be coated with reflective material (920) and/or polished (930). Likewise, the inner wall 129 of the light pipe 121 may be coated with reflective material and/or polished.

The section plates may then be assembled and placed in the light pipe 121. The section plates may be assembled and then placed in the light pipe 121, assembled within the light pipe 121, or a combination thereof. In one embodiment, the first section plate is interlocked with at least a second section plate (940). The interlocked plates are then inserted into the light pipe (950). In addition, the section plates may be secured within the light pipe, such as to inhibit rotation within the light pipe 121 or other movement of the section plates relative to the light pipe 121 (960). In one embodiment, the section plates are inserted into grooves or slots formed in the inner surface of the light pipe such that the section plates are substantially normal to the inner surface and secured within the grooves or slots. In another exemplary method embodiment, instead of interlocking the plates and inserting the interlocked plates in to the light pipe, the method may alternately comprise securing section plates to a spine and inserting the plate/spine assembly into the light pipe.

Still other exemplary method embodiments may comprise methods for assembling sectioned light pipes commensurate with the various other system components described. Although a particular order of actions is illustrated in FIG. 9, these actions can be performed in other temporal sequences. For example, two or more actions depicted in FIG. 9 may be appropriately performed sequentially, concurrently, or simultaneously. Moreover, among the various methods of manufacture described, the components referred to can be similar to the exemplary embodiments of the physical exemplary components and embodiments described earlier. For example, the light pipe described in method 900 can be similar to light guide 120 (FIGS. 1-2), 320 (FIG. 3), 520, 522, 524, and 526 (FIGS. 5A-5D), 620 (FIGS. 6A-6B), and 820 (FIG. 8). Section plates can be similar to section plates 160 and 170 (FIGS. 1-2), 360 and 370 (FIG. 3), 460, 470, and 475 (FIG. 4), and so forth.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including"; "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method for manufacturing a radiation collection device for a missile guidance system, comprising:
forming a light pipe with a first open end, a second open end, and a body spanning a length between the first and second open ends, wherein the body:

defines a hollow interior between the first and second open ends; and comprises a reflective inner wall configured to reflect and concentrate radiation entering the hollow interior through the first open end to the second open end;

inserting a first section plate into the hollow interior to define at least two sections along the length of the body between the first and second open ends, wherein the first section plate comprises a reflective surface configured to reflect radiation;

inserting a second section plate into the hollow interior to define at least one additional section along the length of the body between the first and second open ends, wherein the second section plate comprises a reflective surface configured to reflect radiation; and securing the inserted first section plate and the second section plate to the light pipe.

2. A method of manufacturing a radiation collection device according to claim 1, wherein the first section plate and the second section plate comprise a substantially 90 degree angle between the reflective surface of the first section plate and the reflective surface of the second section plate.

3. A method of manufacturing a radiation collection device according to claim 1, wherein inserting the first section plate and the second section plate into the body substantially divides the hollow interior of the body into substantially equal dimensioned sections.

4. A method of manufacturing a radiation collection device according to claim 1, further comprising notching the reflective inner wall with equal spaced slots to receive a portion of the first section plate and a portion of the second section plate.

5. A method of manufacturing a radiation collection device according to claim 1, further comprising polishing the radiation reflecting material of at least one of the first section plate, the second section plate, and the inner wall of the light pipe.

6. A method of manufacturing a radiation collection device according to claim 1, wherein inserting the first section plate and the second section plate into the body comprises inserting the first section, plate and the at least second section plate normal to a sidewall of the reflective inner wall.

7. A radiation collection device, comprising:
a light pipe having a first open end, a second open end, and a body spanning a length between the first and second open ends, wherein the body:
defines a hollow interior between the first and second open ends; and
comprises a reflective inner wall configured to reflect and concentrate radiation entering the hollow interior through the first open end to the second open end;
a first plate comprising a reflective surface to reflect radiation, wherein the first plate is configured to be inserted into the hollow interior along the length of the body between the first and second open ends to define at least two sections within the body; and
a second plate comprising a reflective surface to reflect radiation, wherein the second plate is configured to be inserted into the hollow interior along the length of the body between the first and second open ends to define at least one additional section within the body.

8. A radiation collection device according to claim 7, wherein each section comprises a substantially 90 degree angle between the reflective surface of the first plate and the reflective surface of the second plate.

9. A radiation collection device according to claim 7, wherein the body further comprises equal spaced slots to receive a portion of the first plate and a portion of the second plate.

10. A radiation collection device according to claim 7, wherein the body tapers from the first end to the second end, and the first plate and the second plate comprise a corresponding taper.

11. A radiation collection device according to claim 7, wherein the first plate and the second plate each comprise a parabolic surface.

12. A radiation collection device according to claim 7, wherein the inserted first plate and the inserted second plate are substantially normal to a sidewall of the reflective inner wall.

13. A missile guidance system comprising:
a radiation detection system; and
a radiation collection system adjacent the radiation detection system, comprising:
a light pipe having a first open end, a second open end, and a body spanning a length between the first and second open ends, wherein the body:
defines a hollow interior between the first and second open ends; and
comprises a reflective inner wall configured to reflect and concentrate radiation entering the hollow interior through the first open end to the second open end and onto the radiation detection system;
a first section plate comprising a reflective surface to reflect radiation, wherein the first plate is configured to be inserted into the hollow interior along the length of the body between the first and second open ends to define at least two sections within the body; and
a second section plate comprising a reflective surface to reflect radiation, wherein the second section plate is configured to be inserted into the hollow interior along the length of the body between the first and second open ends to define at least one additional section within the body.

14. A missile guidance system according to claim 13, wherein the body further comprises sidewall slots to receive a portion of the first section plate and a portion of the at least second section plate.

15. A missile guidance system according to claim 13, wherein the reflective wall and the reflective surface of the first and second plate comprises a polished coating.

16. A missile guidance system according to claim 13, wherein the body tapers from the first end to the second end, and the first section plate and the at least second section plate comprise a corresponding taper.

17. A missile guidance system according to claim 13, wherein the inserted first section plate and the at least second section plate are substantially normal to a sidewall of the reflective inner wall.

18. A missile guidance system according to claim 13, wherein the first section plate and the at least second section plate are inserted into the reflective inner wall to divide the hollow interior of the body into four substantially equal dimensioned sections.

19. A missile guidance system according to claim 13, further comprising a third section plate to divide the hollow interior of the body into substantially three equal dimensioned sections.

* * * * *